May 3, 1966
J. S. IVEY
3,248,964
TRANSMISSION CONTROLS
Filed May 7, 1963
4 Sheets-Sheet 1
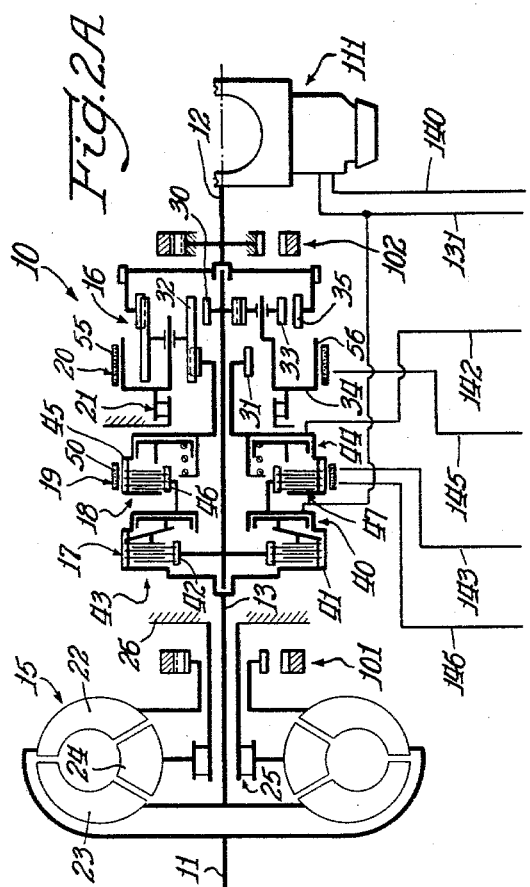
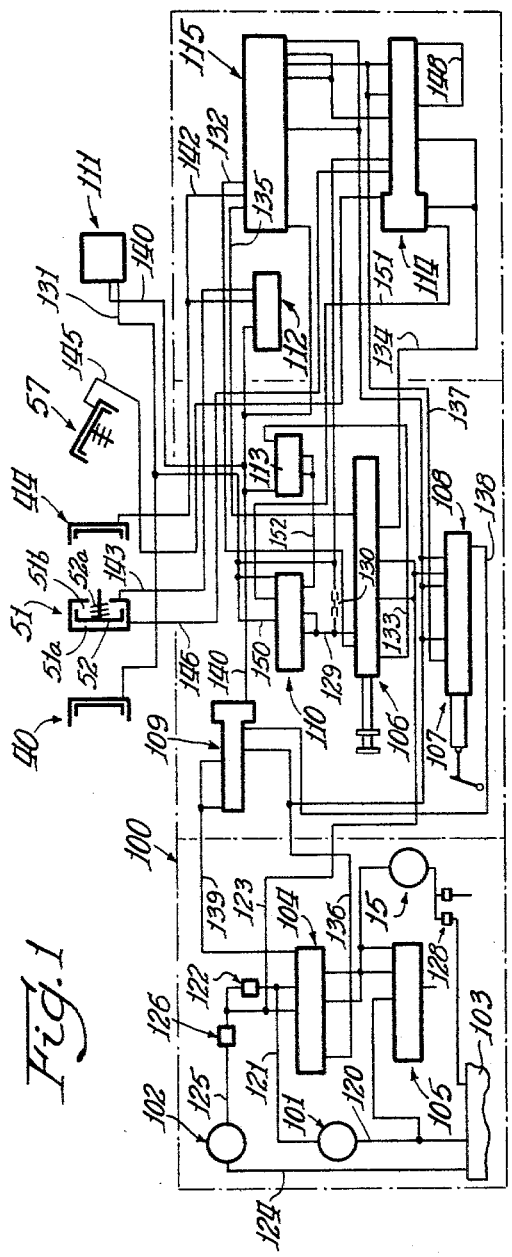
Inventor:
John S. Ivey
By: Robert L. Zieg Atty.

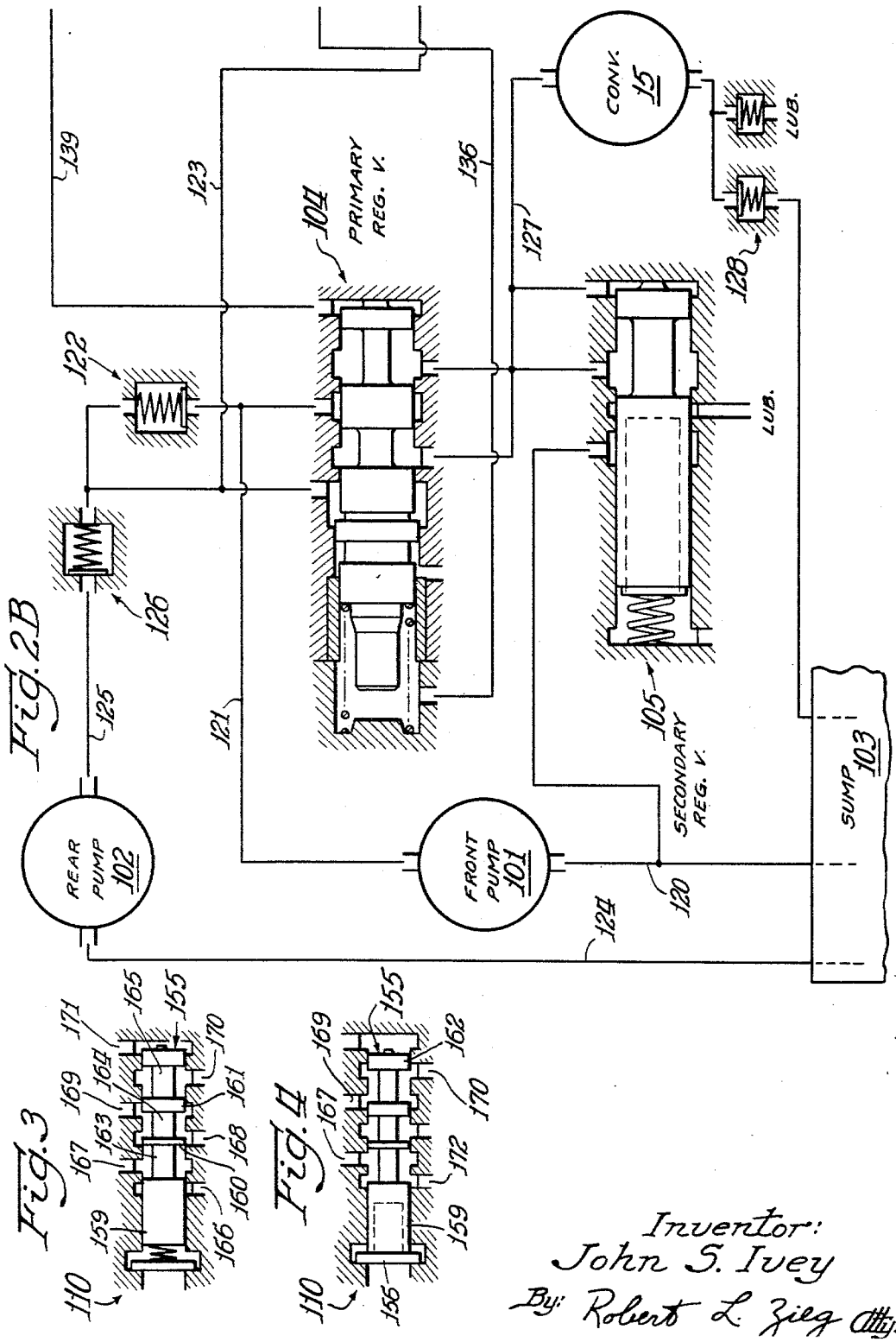

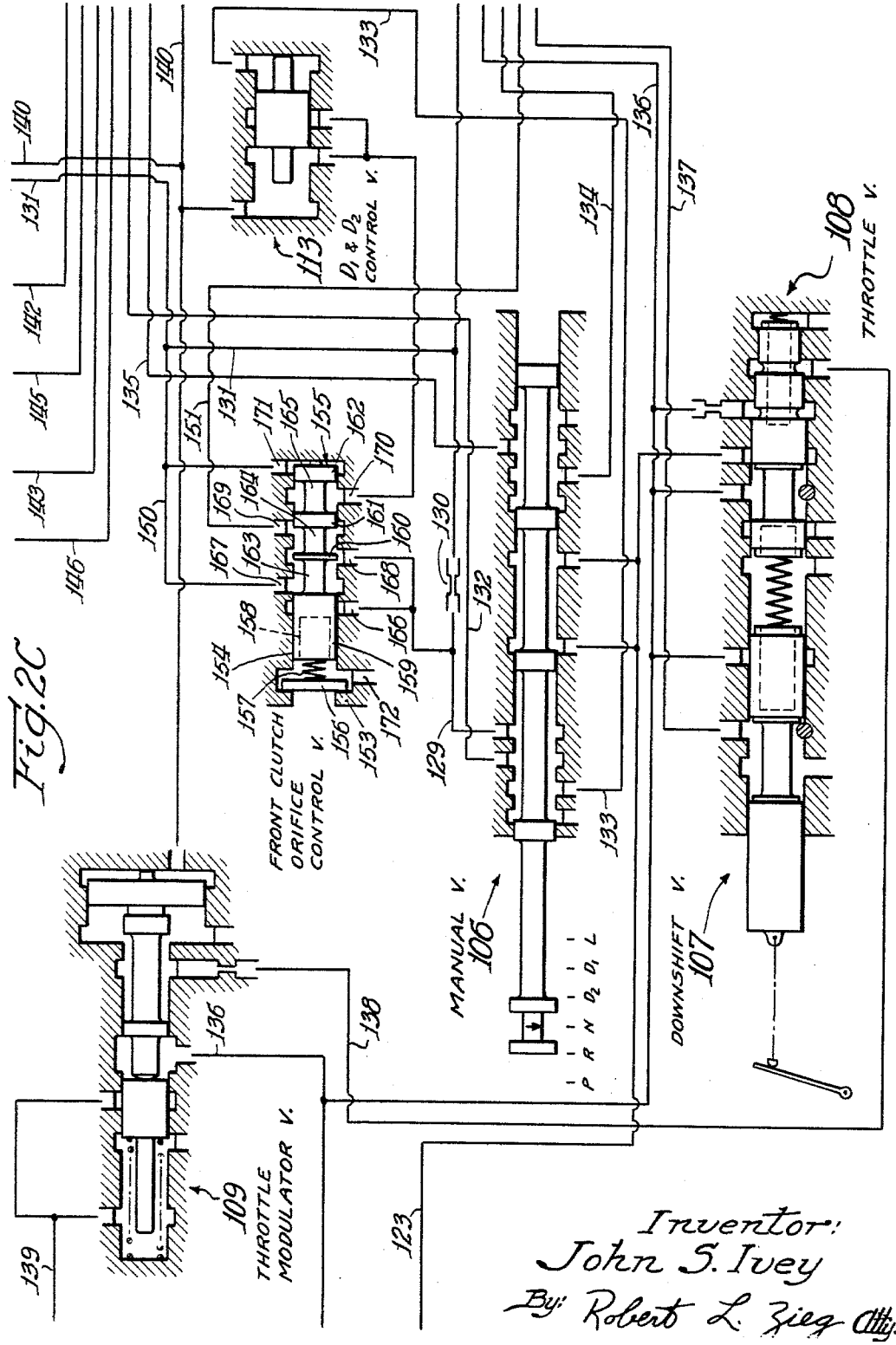

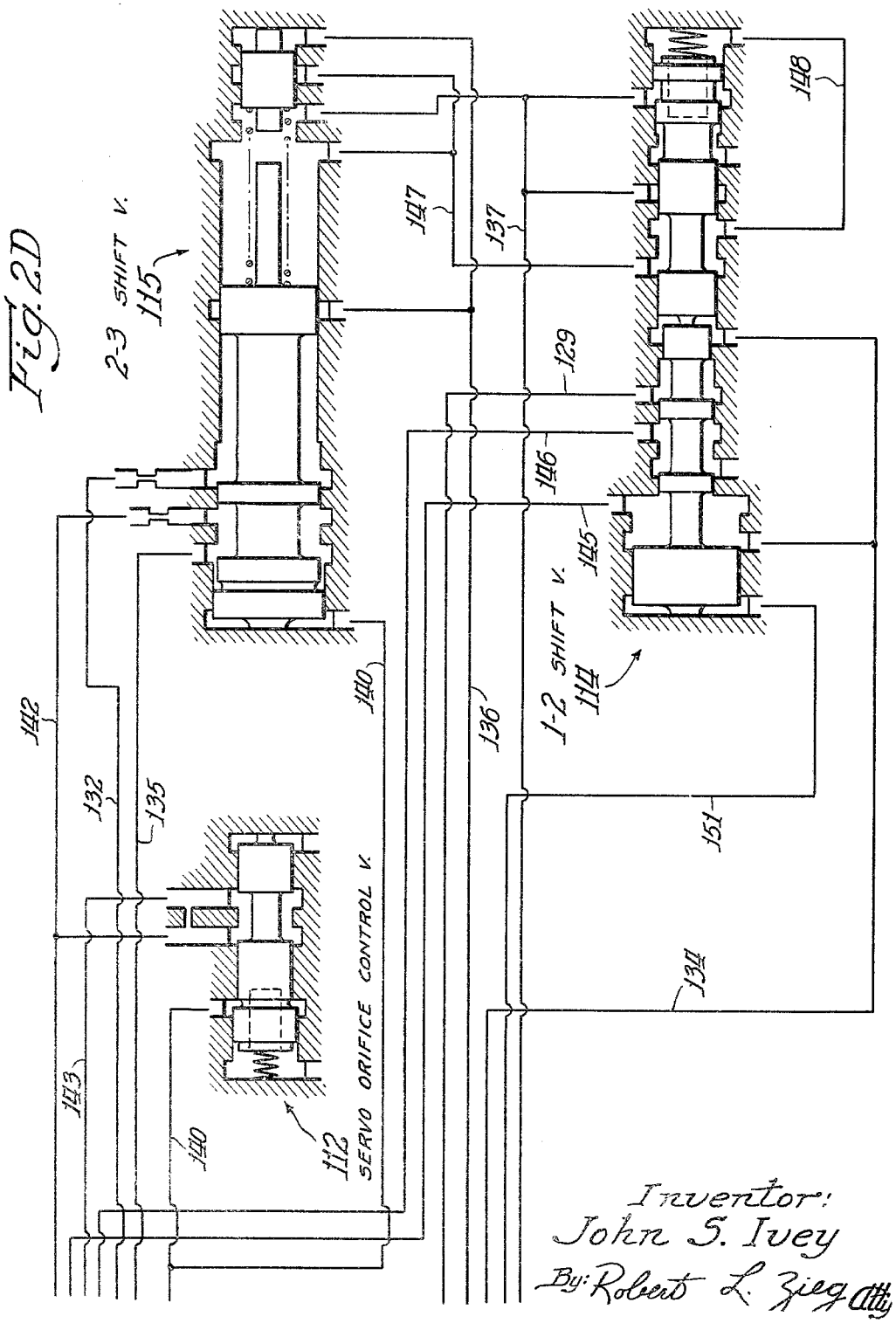

United States Patent Office 3,248,964
Patented May 3, 1966

3,248,964
TRANSMISSION CONTROLS
John S. Ivey, Muncie, Ind., assignor to Borg-Warner Corporation, a corporation of Illinois
Filed May 7, 1963, Ser. No. 278,642
3 Claims. (Cl. 74—472)

This invention relates to a control system for an automatic transmission adapted to be used in automotive vehicles.

The present invention constitutes an improvement of the transmission control system disclosed in my copending applications; Serial No. 12,771 filed March 4, 1960, now U.S. Patent No. 3,117,464 Serial No. 112,645 filed May 25, 1961 and Serial No. 138,858 filed September 18, 1961, now U.S. Patent No. 3,136,175.

The transmission mechanism with which the control system is particularly adapted to be used includes a torque converter, a planetary gear set and a plurality of friction engaging elements operable on the gear set to provide low, intermediate and high gear speed ratios through the transmission. A hydraulic control system is provided to enable automatic shifting between the three forward speed ratios in the transmission. A manual selector lever is incorporated in the hydraulic control system and has Park, Reverse, Neutral, Drive$_1$, Drive$_2$ and Low positions.

It has been found that in the operation of an automatic transmission of the type described that, when the manual selector is moved from the Neutral or Reverse to the Drive$_1$ or Drive$_2$ position, a clunk or bump will result due to the suddenness of the friction elements being engaged to establish a driving relationship between the engine and wheels of the automobile.

Accordingly, it is an object of the present invention to provide a control system for an automatic transmission of the type described wherein when the selector valve is moved to one of the drive positions and fluid pressure is delivered to the servomotor of one friction element to condition the transmission for forward drive, a valve is provided which is operative to also connect fluid pressure to the servomotor of a second friction element while the first element is being engaged so that the second servomotor will act as an hydraulic accumulator to cushion engagement of the first friction element. Thus, the clunk or bump is eliminated without the necessity of adding a separate hydraulic accumulator to the transmission control system.

The invention consists of the novel constructions, arrangements and devices to be hereinafter described and claimed for carrying out the above-stated objects, and such other objects as will appear from the following description of a preferred form of the invention, illustrated with reference to the accompanying drawings, wherein:

FIG. 1 is an over all schematic view of the hydraulic control system of the present invention; and FIG. 2 is a layout diagram of FIGS. 2A, 2B, 2C and 2D which disclose the control system in greater detail.

FIGS. 3 and 4 show the two operating positions of the clutch control valve.

The transmission mechanism with which the present control system is adapted to be used is shown schematically in FIG. 2A and is more particularly described in my co-pending application Serial No. 12,771. The transmission mechanism is designated generally by the numeral 10 and comprises an input shaft 11 and an output shaft 12, a first intermediate shaft 13, and a second intermediate shaft 14, all coaxially aligned. In addition, the transmission 10 comprises a fluid torque converter 15, a planetary gear set 16, a front clutch 17, a rear clutch 18, a front brake 19, a rear brake 20 and a one-way brake 21.

The torque converter 15 comprises a driving element or impeller 22, a driven element or turbine 23 and a reaction element or stator 24. The impeller 22 is connected to be driven by the drive shaft 11; the turbine 23 is connected to the first intermediate shaft 13; and the stator 24 is connected through a one-way brake 25 to a transmission casing 26.

The planetary gear set 16 comprises a first sun gear 30, a second sun gear 31, a plurality of long planet gears 32, a plurality of short planet gears 33, a planet gear carrier 34 and a ring gear 35. The short planet gears 33 are in mesh with the sun gear 30 and with the long planet gears 32; and the long planet gears 32 are in mesh with the sun gear 31 and ring gear 35. The sun gear 30 is connected with the second intermediate shaft 14 and the ring gear 35 is connected to the output shaft 12.

The front clutch 17 comprises a fluid pressure servomotor 40 for engaging the clutch, an outer shell 41, an inner hub 42 and a plurality of interleaved friction discs 43. The outer shell 41 is connected to the first intermediate shaft 13 and the inner hub 42 is connected to the second intermediate shaft 14.

The rear clutch 18 comprises a fluid pressure actuated servomotor 44 for engaging the clutch, an outer shell 45, an inner hub 46 and a plurality of interleaved friction discs 47. The inner hub 46 is connected to the outer shell 41 of the clutch 17, and the outer shell 45 is connected to the second sun gear 31 of the planetary gear set 16.

The front brake 19 comprises a friction band 50, adapted to engage the outer shell 45 of the rear clutch 18 for holding the sun gear 31, and a fluid pressure actuated servomotor 51 for applying the brake 19. The servomotor 51 is divided into two cavities, an apply cavity 51a and a disapply cavity 51b, the two cavities being separated by a movable piston 52 which acts on the brake band 50 and is urged to the left as illustrated in FIG. 1 by spring 52a.

The rear brake 20 comprises a friction band 55 adapted to engage a brake drum 56 and a fluid pressure servomotor 57 for applying the band 55. The drum 56 is connected to the planet gear carrier 34 and is effective when the brake 20 is engaged to hold the carrier 34 for certain driving gear ratios to be described hereinafter.

The one-way brake 21 is interconnected between the planet gear carrier 34 and the transmission casing 26 and is effective to hold the carrier 34 for normal low speed start.

*Mechanical operation*

The transmission mechanism 10 provides three forward drive gear ratios and a reverse drive, and also has a neutral condition. Neutral condition is obtained when all of the brakes and clutches are disengaged.

Low speed forward drive is obtained by engagement of the clutch 17 and of the one-way brake 21. In this condition driving torque from a driving engine (not shown) is transmitted from the drive shaft 11 through the torque converter 15, the first intermediate shaft 13, the engaged clutch 17 and second intermediate shaft 14 to the sun gear 30. The one-way brake 21 holds the planet gear carrier 34 so that it serves as a reaction element for the gear set 16 and the ring gear 35 is driven by the planet gears 32 and 33 for driving the output shaft 12.

A subsequent up-shift to second or intermediate speed forward drive is obtained by engagement of the front brake 19. Torque is transmitted to the first sun gear 30 through the clutch 17 as previously described, and the engaged brake 19 is effective to hold the sun gear 31 stationary so that it serves as a reaction element for the gear set 16. The one-way brake 21 overruns in this condition and the ring gear 35 is driven by the planet gears 32 and 33 for driving the output shaft 12 at an intermediate speed drive ratio.

A subsequent up-shift to high or direct forward drive is obtained by disengagement of the brake 19 and engagement of the rear clutch 18. In this condition, driving torque is supplied to the first sun gear 30 as previously described, and in addition is supplied through the engaged clutch 18 to the second sun gear 31. The engaged clutches 17 and 18 effectively lock together the two sun gears 30 and 31 so that the gear set 16 rotates as a unit and a 1:1 or direct drive ratio is obtained through the transmission.

Reverse drive is obtained by disengagement of the clutch 17 and engagement of the rear clutch 18 and rear brake 20. In this condition driving torque from the engine is transmitted through the torque converter 15, the intermediate shaft 13, the outer shell 41 of the clutch 17, and through the engaged clutch 18 to the sun gear 31. The brake 20 is effective to hold the planet gear carrier 34 stationary so that it serves as a reaction element for the gear set 16. Forward driving torque supplied through the sun gear 31 is transmitted through the long planet gears 32 for driving the ring gear 35 and the output shaft 12 in the reverse direction.

A manual low speed forward drive condition is obtainable by engagement of the front clutch 17 and rear brake 20. The rear clutch 18 and front brake 19 are disengaged. In this condition the rear brake 20 functions to hold the planet gear carrier 34 stationary so that it serves as a reaction element for the gear set 16. Low speed forward drive condition is then obtained in the same manner as when the one-way brake 21 is engaged to hold the carrier 34 stationary, except that up-shifts to higher speed ratios are not obtainable unless the manual selector lever is moved to a drive position, as will be described later.

The hydraulic control system for the transmission of FIG. 2A is shown schematically in FIG. 1 and is shown in detail in FIGS. 2B, 2C and 2D. The control system is designated generally by the numeral 100 and includes a front pump 101 connected to be driven by the drive shaft 11 and a rear pump 102 connected to be driven by the driven shaft 12. A fluid supply reservoir or sump 103 is formed on the bottom interior of the transmission casing 26 and contains the working fluid for the control system 100.

The hydraulic control system 100 also includes the torque converter 15 and the following valves:

104—Primary regulator valve
105—Secondary regulator valve
106—Manual selector valve
107—Down shift valve
108—Throttle valve
109—Throttle modulator valve
110—Front clutch orifice control valve
111—Governor valve
112—Servo orifice control valve
113—$D_1$ and $D_2$ control valve
114—1–2 shift valve
115—2–3 shift valve Whenever the vehicle engine is running so as to drive front pump 101, fluid is drawn from the sump 103 through a suction line 120 and discharged under pressure into conduit 121. Fluid in the conduit 121 is supplied to a port in the primary regulator valve 104 and is delivered through a front pump check valve 122 into a conduit 123. The conduit 123 will hereinafter be referred to as the line pressure conduit for supplying line pressure to the rest of the control system 100.

Whenever the driven shaft 12 is turning forwardly above some predetermined speed, the rear pump 102 draws fluid from the sump 103 through a conduit 124 and discharges fluid under pressure into a conduit 125. From the conduit 125 fluid passes through a rear pump check valve 126 into the line pressure conduit 123.

The primary regulator valve 104 regulates the line pressure in conduit 123 for various operative conditions of the transmission to be described hereinafter. Part of the fluid supplied to the primary regulator valve 104 is delivered into a conduit 127 for supplying the converter 15. The pressure within the converter 15 is regulated by the secondary regulator valve 105 and fluid is discharged from the converter 15 through a check valve 128 into the sump 103.

Line pressure in the conduit 123 is supplied to the manual selector valve 106 and can be directed by this valve through a plurality of conduits to various other valves and hydraulic servomotors of the transmission.

A conduit 129 connects the manual valve 106 to the front clutch orifice control valve 110 and through restriction 130 to the 1–2 shift valve 114. Branch conduit 131 is connected to conduit 129 and carries fluid to the front clutch servomotor 40 and to the governor valve 111. The manual valve 106 is also connected by means of a conduit 132 to the 2–3 shift valve 115; by means of a conduit 133 to the $D_1$ and $D_2$ control valve 113; by means of a conduit 134 to the 1–2 shift valve 114; and by means of a conduit 135 to the 2–3 shift valve 115.

The down-shift valve 107 is connected by means of a conduit 136 to the throttle valve 108, the throttle modulator valve 109, the right end of the 2–3 shift valve 115, and the left end of the primary regulator valve 104. The down-shift valve 107 is also connected by means of a conduit 137 to the 1–2 shift valve 114 and 2–3 shift valve 115.

The throttle valve 108 is connected by means of a conduit 138 to the throttle modulator valve 109, and the valve 109 is connected by means of a conduit 139 to the right end of the primary regulator valve 104. The conduit 136 will hereinafter be referred to as the throttle pressure conduit and the conduit 139 will be referred to as the throttle modulator pressure conduit.

The throttle modulator valve 109 is also connected by means of a conduit 140 to the governor valve 111, the servo orifice control valve 112, the $D_1$ and $D_2$ control valve 113, and the 2–3 shift valve 115. The conduit 140 is filled with fluid under pressure from the governor valve 111. The pressure in this conduit increases directly as a function of the speed of the driven shaft 12 and this pressure will hereinafter be referred to as governor pressure.

The servo orifice control valve 112 is connected by means of a conduit 142 to the 2–3 shift valve 115 and to the rear clutch servo 44; and by means of a conduit 143 to the disapply cavity 51b of the front brake servomotor 51 for the front brake 19.

The $D_1$ and $D_2$ control valve 113 is connected to the governor pressure conduit 140.

The 1–2 shift valve 114 is connected by means of a conduit 145 to the rear brake servo 57; by means of a conduit 146 to the apply cavity 51a of the front brake servo 51; and by means of a conduit 147 to the 2–3 shift valve 115. The 1–2 shift valve 114 also has a conduit or channel 148 interconnecting two ports on the same bore.

The structure and operation of the control system of my earlier applications Serial Nos. 12,771, 112,645 and 138,858 have been described in some detail in those applications. The description of the present control system will be directed only to the improvements of that control system.

The front clutch orifice control valve 110 is connected by means of a conduit 150 to the conduit 131, by means of conduit 151 to the left end of the 1–2 shift valve 114, and by means of conduit 152 to the $D_1$ and $D_2$ control valve 113. The front clutch orifice control valve 110 comprises a casing portion 153 having a longitudinal cylindrical bore 154 therein, a valve piston 155, an end plug 156 and a spring 157 disposed within a recess 158 in the valve piston 155. The spring 157 urges the valve piston 155 to the right as shown in FIG. 2C. The valve piston 155 is formed with lands 159, 160, 161 and 162 and annular grooves 163, 164, and 165 between the lands.

The casing portion 153 is formed with ports 166, 167, 168, 169, 170, 171 and 172 formed therein. Ports 166 and 168 are connected to line pressure conduit 129, ports 167 and 171 are connected to conduit 150; port 169 is connected to conduit 151, port 170 is connected to conduit 152 and port 172 is connected to the sump.

*Operation*

Assuming the manual selector valve 106 is moved from the neutral position to the $D_1$ position, line pressure will be admitted from conduit 123 into conduits 129 and 132. At this time the front clutch orifice control valve 110 is all the way to the right as shown in FIG. 2C due to the force of spring 157. Line pressure at port 166 is therefore blocked by land 159 of the valve piston 155. Line pressure in the port 168 passes through groove 164, port 169, and into conduit 151. Line pressure also passes from port 168 through grooves 163, port 167, and into conduit 150.

Line pressure in conduit 150 flows into conduit 131 to supply the governor 111 and the front clutch servomotor 40 with fluid pressure. Line pressure in conduit 150 also passes through conduit 131 into conduit 129 on the right-hand side of the restriction 130 and flows to the 1–2 shift valve 114. Line pressure in conduit 151 flows to the left-hand end of the 1–2 shift valve and moves the 1–2 shift valve to the right or its second speed position. Line pressure in conduit 129 can now flow through the 1–2 shift valve into conduit 146 and to apply cavity 51a of the servomotor 51.

The valve 110 will remain in the position illustrated in FIG. 2C only for such time as is necessary for the conduits 146, 150 and 151, and the servomotors 40 and 51 to be filled with fluid. As soon as the conduits are filled and the pistons of the servomotors 40 and 51 begin to move, the pressure will build up in the conduit 150, and port 171 and will act on the right-hand side of the land 162 to move the valve piston 155 to the position as illustrated in FIG. 3.

In the position illustrated in FIG. 3 line pressure continues to be admitted through the groove 164 into the port 169 and conduit 151 to the left-hand end of the 1–2 shift valve 114. This pressure holds the 1–2 shift valve in the second speed position connecting line pressure in conduit 129 to conduit 146 and apply cavity 51a of the second speed servomotor 51. At this time line pressure is kept from flowing to port 167 and line 150 by the land 160, coacting with the casing 153 on the left side of the port 168. Land 159 continues to block the line pressure at the port 166. With port 166 blocked, line pressure in conduit 131 flowing to servomotor 40 must flow through restriction 130 in conduit 129. The restriction 130 shows the flow of the fluid to the servomotors 40 and 51 allowing sufficient time for the partially engaged clutch 43 to stop the rotation of the input shaft 13. The pressure in cavity 51a of servomotor 51 moves the piston 52 to the right against spring 52a after which the pressure in line 150 builds up and forces the front clutch orifice control valve piston 155 to the left as shown in FIG. 4 which by-passes restriction 130 and applies full line pressure to clutch 43 through port 166, groove 163, port 167, conduits 150 and 131 to complete the engagement. Due to the partial initial engagement of clutch 43 the driving relationship between the engine and the wheels of the vehicle is gradually established and the clunk or bump is eliminated in the shift from neutral or reverse to drive in the transmission.

After the front clutch orifice control moves to the position shown in FIG. 4 land 161 will now block any line pressure in conduit 129 from flowing through port 169 into conduit 151. The conduit 151 is now supplied with governor pressure which flows from conduit 140 through the $D_1$ and $D_2$ control valve 113 into conduit 152 and port 170 of the valve 110. Governor pressure is thereby communicated through conduit 151 to the left-hand end of the 1–2 shift valve 114 and the 1–2 shift valve will now move to the position illustrated in FIG. 2D, since governor pressure is at a minimum at this time (the vehicle being at a standstill at the time of the neutral to drive shift). The apply cavity 51a of the second speed servomotor 51 is now exhausted through the conduit 146 and a port in the 1–2 shift valve (more particularly described in copending application S.N. 127,771).

The clutch 40 is thus fully engaged and due to the action of the one-way brake 21 low speed drive is established in the transmission. The 1–2 shift valve is now free to operate in the normal manner, being influenced by governor pressure on the left-hand end and throttle pressure on the right-hand end of the shift valve.

As described in application S.N. 127,771, if the $D_2$ position of the manual valve 106 is selected, a second speed start is desired and line pressure will be communicated from the conduit 133 through the $D_1$ and $D_2$ control valve and into conduit 152. In the neutral to $D_2$ shift, the front clutch orifice control valve 110 and the control system will work in the same manner as described above, except that line pressure rather than governor pressure will be communicated from the conduit 152 into the conduit 157 and to the left-hand end of the 1–2 shift valve 114 when the valve 110 moves to the position illustrated in FIG. 4. The 1–2 shift valve will thus be held in the second speed position to provide the desired second or intermediate speed start.

From the above description it will be obvious that a simple and novel means of eliminating the neutral to drive clunk or bump has been provided by use of a servomotor of the transmission as an accumulator during the neutral to drive shift. By use of the servomotor 51 as an accumulator the bump is eliminated without adding an accumulator to the control system for the transmission.

While I have described my invention in connection with certain specific embodiments thereof, it is to be understood that this is by way of illustration and not by way of limitation, and the scope of my invention is defined solely by the appended claims which should be construed as broadly as the prior art will permit.

I claim:

1. In a transmission mechanism for an automotive vehicle the combination of a drive shaft, a driven shaft, gearing interconnecting said shafts, a hydraulic circuit for said transmission including passage means and a source of fluid pressure, means operatively associated with said gearing providing a first drive ratio between said shafts including a first fluid pressure actuated servomotor in said hydraulic circuit, means operatively associated with said gearing providing a second drive ratio between said shafts including a second fluid pressure actuated servomotor in said hydraulic circuit, a selector valve in said hydraulic circuit having a first position in which no fluid pressure is communicated to said servomotors and a second position in which fluid pressure is communicated to said first servomotor to establish said first drive ratio between said shafts, and means in said hydraulic circuit initially hydraulically interconnecting said first servomotor and said second servomotor while said first servomotor is being actuated whereby said second servomotor will act as a hydraulic accumulator for the fluid being delivered to said first servomotor to cushion the actuation of said first servomotor and said means subsequently acting to interrupt said hydraulic inter-connection to allow said first ratio drive to be effective for driving the vehicle.

2. In a transmission mechanism for an automotive vehicle the combination of a drive shaft, a driven shaft, gearing interconnecting said shafts, a hydraulic circuit for said transmission including passage means and a source of fluid pressure, means operatively associated with said gearing providing a first drive ratio between said shafts including a first engageable friction device, a hydraulic servomotor in said hydraulic circuit operatively associated with said first friction device, means operatively associated with said gearing providing a second drive ratio between said shafts including a second engageable friction device, a hydraulic servomotor in said hydraulic circuit operatively associated with said second friction device, a selector valve in said hydraulic circuit having a first position in which no fluid pressure is communicated to said servomotors and a second postion in which fluid pressure is communicated to said servomotor for said first friction device to establish said first drive ratio, valve means in said hydraulic circuit between said selector valve and said servomotors operable to initially hydraulically interconnect said servomotors while said first servomotor is being actuated, said servomotor for said second friction device acting as a hydraulic accumulator for the fluid being delivered to said servomotor for said first friction device to cushion the engagement of said first friction device, said valve means subsequently acting to interrupt said hydraulic inter-connection to allow said first ratio drive to be effective for driving the vehicle.

3. In a transmission mechanism for an automotive vehicle the combination of a drive shaft, a driven shaft, gearing interconnecting said shafts, means operatively associated with said gearing providing a low speed drive ratio between said shafts including a first engageable friction device, a hydraulic servomotor operatively associated with said first friction device, means operatively associated with said gearing providing an intermediate speed ratio between said shafts including a second engageable friction device, a hydraulic servomotor operatively associated with said second friction device including a piston movable by fluid pressure to engage said second friction device and a return spring associated with said piston, a source of fluid pressure, a manual selector valve connected to said source of fluid pressure and to said servomotors, said selector valve having a "neutral" position in which no fluid pressure is communicated to said servomotors, said selector valve having a "drive" position in which fluid pressure is communicated to said servomotor for said first friction device, valve means in the connection between said selector valve and said last-mentioned servomotor, said valve means initially hydraulically interconnecting said servomotors when said manual selector valve is moved from said "neutral" position to said "drive" position, said servomotor for said second friction device acting as a hydraulic pressure accumulator for fluid pressure being communicated to the servomotor for said first friction device while said first friction device is being engaged to cushion engagement of said first friction device, said valve means subsequently acting to interrupt said hydraulic interconnection to allow said first ratio drive to be effective for driving the vehicle.

References Cited by the Examiner

UNITED STATES PATENTS 2,981,126 4/1961 Kelley _____ 74
3,000,230 9/1961 Froslie _____ 74

DON A. WAITE, *Primary Examiner.*